US007970671B2

(12) United States Patent
Hahn-Carlson et al.

(10) Patent No.: US 7,970,671 B2
(45) Date of Patent: Jun. 28, 2011

(54) AUTOMATED TRANSACTION PROCESSING SYSTEM AND APPROACH WITH CURRENCY CONVERSION

(75) Inventors: Dean W. Hahn-Carlson, Lilydale, MN (US); William H. Bailey, Minnetonka, MN (US); James B. Pogue, St. Paul, MN (US)

(73) Assignee: Syncada LLC, Minneapolis, MN (US)

( * ) Notice: Subject to any disclaimer, the term of this patent is extended or adjusted under 35 U.S.C. 154(b) by 1133 days.

(21) Appl. No.: 11/104,394

(22) Filed: Apr. 12, 2005

(65) Prior Publication Data

US 2006/0229982 A1 Oct. 12, 2006

(51) Int. Cl.
*G06Q 40/00* (2006.01)
(52) U.S. Cl. .......................................................... 705/35
(58) Field of Classification Search .................. None
See application file for complete search history.

(56) References Cited

U.S. PATENT DOCUMENTS

| | | | |
|---|---|---|---|
| 4,114,027 A | 9/1978 | Slater et al. |
| 4,270,042 A | 5/1981 | Case |
| 4,305,059 A | 12/1981 | Benton |
| 4,412,287 A | 10/1983 | Braddock, III |
| 4,567,359 A | 1/1986 | Lockwood |
| 4,713,761 A | 12/1987 | Sharpe et al. |
| 4,725,719 A | 2/1988 | Oncken et al. |
| 4,750,119 A | 6/1988 | Cohen et al. |
| 4,799,156 A | 1/1989 | Shavit et al. |
| 4,926,325 A | 5/1990 | Benton et al. |
| 4,949,272 A | 8/1990 | Vanourek et al. |
| 4,960,981 A | 10/1990 | Benton et al. |
| 5,008,827 A | 4/1991 | Sansone et al. |
| 5,025,372 A | 6/1991 | Burton et al. |
| 5,040,132 A | 8/1991 | Schuricht et al. |
| 5,043,908 A | 8/1991 | Manduley et al. |
| 5,077,694 A | 12/1991 | Sansone et al. |
| 5,117,364 A | 5/1992 | Barns-Slavin et al. |
| 5,153,842 A | 10/1992 | Dlugos, Sr. et al. |
| 5,161,109 A | 11/1992 | Keating et al. |
| 5,168,444 A | 12/1992 | Cukor et al. |
| 5,175,416 A | 12/1992 | Mansvelt et al. |

(Continued)

FOREIGN PATENT DOCUMENTS

GB 2398894 9/2004

(Continued)

OTHER PUBLICATIONS

Exchange risk and Exchange rate pass-through Huang, Jui-Chi, PhD, 2005, vol. 67/02-A of Dissertation Abstracts International.*

(Continued)

*Primary Examiner* — Alexander Kalinowski
*Assistant Examiner* — Bruce I Ebersman
(74) *Attorney, Agent, or Firm* — Crawford Maunu PLLC

(57) ABSTRACT

Transaction management for contract and contract-related approaches is facilitated. According to an example embodiment of the present invention, a transaction management system automatically sets contract terms including currency conversion terms for a transaction based on business rules previously established between parties to a transaction. In one implementation, the transaction management node automatically derives a contract term including a pricing-related term for a transaction between a buyer and seller using contract information therefor. The pricing-related term is used to set a price for the transaction, and a currency conversion term is used to convert the set price (or a portion of the set price corresponding to a particular transaction party) into a different currency.

31 Claims, 3 Drawing Sheets

U.S. PATENT DOCUMENTS

| | | | |
|---|---|---|---|
| 5,208,446 A | 5/1993 | Martinez | |
| 5,218,188 A | 6/1993 | Hanson | |
| 5,220,501 A | 6/1993 | Lawlor et al. | |
| 5,222,018 A | 6/1993 | Sharpe et al. | |
| 5,231,569 A | 7/1993 | Myatt et al. | |
| 5,285,383 A | 2/1994 | Lingrey et al. | |
| 5,293,310 A | 3/1994 | Carroll et al. | |
| 5,329,589 A | 7/1994 | Fraser et al. | |
| 5,334,823 A | 8/1994 | Noblett, Jr. et al. | |
| 5,334,824 A | 8/1994 | Martinez | |
| 5,337,246 A | 8/1994 | Carroll et al. | |
| 5,357,563 A | 10/1994 | Hamilton et al. | |
| 5,393,963 A | 2/1995 | Thomas et al. | |
| 5,426,281 A | 6/1995 | Abecassis | |
| 5,440,634 A | 8/1995 | Jones et al. | |
| 5,485,369 A | 1/1996 | Nicholls et al. | |
| 5,631,821 A | 5/1997 | Muso | |
| 5,666,493 A | 9/1997 | Wojcik et al. | |
| 5,677,955 A | 10/1997 | Doggett et al. | |
| 5,694,551 A | 12/1997 | Doyle et al. | |
| 5,717,989 A | 2/1998 | Tozzoli et al. | |
| 5,732,400 A | 3/1998 | Mandler | |
| 5,794,207 A | 8/1998 | Walker et al. | |
| 5,806,063 A | 9/1998 | Dickens | |
| 5,842,178 A | 11/1998 | Giovannoli | |
| 5,893,080 A | 4/1999 | McGurl et al. | |
| 5,910,896 A | 6/1999 | Hahn-Carlson | |
| 5,920,847 A | 7/1999 | Kolling et al. | |
| 5,924,082 A | 7/1999 | Silverman et al. | |
| 5,930,363 A | 7/1999 | Stanford et al. | |
| 5,960,407 A | 9/1999 | Vivona | |
| 5,982,891 A | 11/1999 | Ginter et al. | |
| 5,995,976 A | 11/1999 | Walker et al. | |
| 6,021,202 A | 2/2000 | Anderson et al. | |
| 6,026,374 A | 2/2000 | Chess | |
| 6,029,150 A | 2/2000 | Kravitz | |
| 6,044,362 A | 3/2000 | Neely | |
| 6,047,268 A | 4/2000 | Bartoli et al. | |
| 6,055,519 A | 4/2000 | Kennedy et al. | |
| 6,070,150 A | 5/2000 | Remington et al. | |
| 6,131,087 A | 10/2000 | Luke et al. | |
| 6,151,588 A | 11/2000 | Tozzoli et al. | |
| 6,167,378 A | 12/2000 | Webber, Jr. | |
| 6,199,046 B1 * | 3/2001 | Heinzle et al. | 705/1 |
| 6,209,095 B1 | 3/2001 | Anderson et al. | |
| 6,223,168 B1 | 4/2001 | McGurl et al. | |
| 6,266,640 B1 | 7/2001 | Fromm et al. | |
| 6,267,292 B1 | 7/2001 | Walker et al. | |
| 6,323,894 B1 | 11/2001 | Katz et al. | |
| 6,477,510 B1 * | 11/2002 | Johnson | 705/30 |
| 6,493,685 B1 | 12/2002 | Ensel et al. | |
| 6,526,443 B1 | 2/2003 | Goldsmith et al. | |
| 6,571,149 B1 | 5/2003 | Hahn-Carlson | |
| 6,697,702 B1 | 2/2004 | Hahn-Carlson | |
| 6,789,252 B1 | 9/2004 | Burke et al. | |
| 6,829,590 B1 * | 12/2004 | Greener et al. | 705/38 |
| 6,944,595 B1 * | 9/2005 | Graser et al. | 705/1 |
| 7,529,706 B2 * | 5/2009 | Kulasooriya et al. | 705/37 |
| 7,590,575 B2 * | 9/2009 | Yu et al. | 705/35 |
| 2001/0011241 A1 | 8/2001 | Nemzow | |
| 2001/0032171 A1 * | 10/2001 | Brink et al. | 705/37 |
| 2001/0032183 A1 | 10/2001 | Landry | |
| 2001/0047311 A1 | 11/2001 | Singh | |
| 2002/0042782 A1 * | 4/2002 | Albazz et al. | 705/80 |
| 2002/0059134 A1 | 5/2002 | Ebbs et al. | |
| 2002/0062278 A1 * | 5/2002 | Ingram et al. | 705/39 |
| 2002/0072956 A1 | 6/2002 | Willems et al. | |
| 2002/0087344 A1 | 7/2002 | Billings et al. | |
| 2002/0087455 A1 | 7/2002 | Tsagarakis | |
| 2002/0095355 A1 * | 7/2002 | Walker et al. | 705/26 |
| 2002/0107794 A1 | 8/2002 | Furphy et al. | |
| 2002/0120570 A1 | 8/2002 | Loy | |
| 2002/0123973 A1 | 9/2002 | Eccles et al. | |
| 2002/0161719 A1 | 10/2002 | Manning et al. | |
| 2002/0184527 A1 | 12/2002 | Chun et al. | |
| 2002/0198833 A1 * | 12/2002 | Wohlstadter | 705/40 |
| 2003/0018563 A1 | 1/2003 | Kilgour et al. | |
| 2003/0041008 A1 * | 2/2003 | Grey et al. | 705/37 |
| 2003/0097318 A1 * | 5/2003 | Yu et al. | 705/35 |
| 2003/0126047 A1 | 7/2003 | Hollar et al. | |
| 2003/0135435 A1 | 7/2003 | Aharoni | |
| 2003/0158811 A1 | 8/2003 | Sanders et al. | |
| 2003/0191711 A1 | 10/2003 | Jamison et al. | |
| 2003/0233286 A1 | 12/2003 | Hahn-Carlson et al. | |
| 2003/0233292 A1 | 12/2003 | Richey et al. | |
| 2003/0233321 A1 | 12/2003 | Scolini et al. | |
| 2004/0010463 A1 | 1/2004 | Hahn-Carlson | |
| 2004/0153403 A1 * | 8/2004 | Sadre | 705/39 |
| 2005/0234820 A1 | 10/2005 | MacKouse | |
| 2005/0251478 A1 * | 11/2005 | Yanavi | 705/40 |
| 2006/0010058 A1 * | 1/2006 | D'Hers et al. | 705/35 |
| 2007/0192178 A1 * | 8/2007 | Fung et al. | 705/14 |

FOREIGN PATENT DOCUMENTS

| | | |
|---|---|---|
| WO | WO 0182193 | 11/2001 |
| WO | WO 0188813 | 11/2001 |

OTHER PUBLICATIONS

Estimating Exchange Rate Exposures: Issues in Model Structure, Gordon M Bodnar, Financial Management V32, n1, pp. 35-67, spring of 2003.*

Germany seizes the Emu initiative, International Tax Review, V8, n5, pp. 43-46, May 1997, Plewka Harald.*

* cited by examiner

AUTOMATED TRANSACTION PROCESSING SYSTEM AND APPROACH WITH CURRENCY CONVERSION

FIELD OF THE INVENTION

The present invention is directed to communications and data processing and, more specifically, to communications and data processing involving the processing of transactions involving two or more currencies.

BACKGROUND

Operational management of contractual and transactional interactions between buyers, sellers and others involved in the exchange of products for purposes of commerce have typically been labor and time intensive. Generally, the processes of managing transactions between business entities have been unduly burdensome and inefficient. The various parties involved in a transaction typically change proposed terms and aspects of a proposed transaction on a concurrent and/or iterative basis. In addition, transaction aspects involving currency conversion rates and other externally-influenced terms often fluctuate over time, relative to events for a particular transaction. For example, from the time an order is received to the time of performance of the order, currency exchange rates often change.

Often, data representing each corporate participant's view of the interaction is stored across one or more enterprise systems managed by that particular corporate participant and not accessible by other corporate participants. Consequently, it can be difficult to know which draft document represents the most current information about the interaction and whether the parties to the transaction have a common understanding. Where the corporate participants have communicated electronically (e.g., via email and Internet-enhanced communications), these document-synchronization difficulties have been compounded by an increased number of co-existing draft documents being viewed by the parties. Commercial transactions then become more difficult as business entities attempt to perform transactions with each other, and in particular, to perform payment related transactions involving currency conversion.

A typical commercial interaction between a seller offering a product and a buyer desiring to acquire that product moves through multiple steps. First, the buyer and the seller negotiate an agreement as to the price the buyer will pay. When this agreement covers an extended period of time it is typically formalized in a contract or catalog. Contracts and catalogs are typically maintained by the seller in a seller-managed computer system that is separate from the computer system or systems which the seller uses to accept orders, fulfill orders and generate invoices. When the invoice system used by the seller to bill the buyer has a different price file than is resident in the seller-managed contract system, pricing exceptions will occur which will increase the cost of the interaction because buyer and seller personnel will have to resolve the differences before a transaction can be completed. The problem can be compounded when the buyer loads the current contract prices into its procurement system for determination of whether the seller is billing correctly during the pre-payment order/invoice reconciliation process, and even further compounded when the prices are dependent upon currency conversion rates. All of seller's invoicing systems could be representing the current contract while one or more of the buyer's systems still represent an expired or not yet active contract. Some or all of the seller's invoicing systems could be representing expired or not yet active contracts while all of the buyer's procurement systems are up to date.

Where different currencies are involved for a particular transaction, a currency conversion is typically made to convert into a currency desired by a buyer, seller or other party to the transaction. However, because currency conversion rates vary greatly over time, it is often difficult to determine not only when the conversion is to take place, but at what rate and at what cost to which transaction party. In addition, different conversion rates are available from different sources. Furthermore, where pricing-related issues such as those discussed above occur, the payment issues are further compounded with currency conversion requirements associated with the pricing.

The number of combinations of events leading to transaction misunderstandings and disagreements contributes significantly to the overall cost of settling for the exchange of goods and/or services that are the subject of a transaction. As a further complication, the contract contents, the order, the invoice and other documents representing the transaction and required to settle the transaction often only exist in paper form for access to the individuals attempting to resolve exceptions. Further, the data that does exist electronically is often scattered across numerous applications such as accounts payable, accounts receivable, purchasing, accounting, buyer or seller group, shipping, and receiving. Moreover, where each buyer transacts with many sellers and each seller transacts with many buyers, tracking such drafts becomes increasingly more difficult.

One type of transaction for which the above difficulties apply is a shipping transaction. Traditional approaches have led to many challenges to managing transactions between one shipper and one carrier. Typically, however, there are multiple carriers and shippers involved in multiple transactions, which makes the management process more complex, and that much more time-consuming and inefficient. The process is labor intensive in that it relies on physically matching the hard copy of a bill of lading (BOL) for proof of delivery with the hard copy invoice and then trying to apply the terms of a hard copy contract to calculate whether the invoice amount is proper to pay. Exceptions need to be communicated to the trading partner, often involving faxing or mailing paper copies of support materials. Responses to requests for information often results in more paper copies with hand-written annotations that alter the understanding of how the transaction actually transpired. The ensuing series of repetitive and time consuming steps are a source of additional operational expense for both buyer and seller. Also, each BOL is often rated multiple times by multiple parties creating excessive redundancy.

Due to such difficulties and convoluted processes, traditional shipment transaction management systems are highly susceptible to billing errors and fraud. For example, there has been no connection between the delivery of goods and when the shipper is billed for delivery. This may result in double billing, no billing at all, or overbilling the shipper for freight delivery charges. Also, auditing errors may occur, which results in incorrect billing or payment, which is exasperated when currency conversion is involved. In addition, the carrier waits a disproportionately long time for payment while the invoice is being audited and/or disputed. For example, traditionally, a delivery takes about five days whereas payment takes about forty-five days. This delay adversely affects the carrier's working capital resources which, in turn, raises the carrier's transaction cost and raises the prices the carrier must charge to earn the economic return required to remain in business. Where currency conversion is involved, conversion rates vary over time and thus delays due to auditing errors or delivery may result in a very different conversion rate, if the conversion is carried out on a basis that fluctuates with these delays.

Additional costs arise as a result of the existing inefficiencies. Many of the costs are individually small, but very large in the aggregate. For example, the carrier incurs administrative costs including: the cost to create and deliver the initial invoice, costs of resolving billing disputes, costs of providing a signed copy of the BOL to the shipper, costs of posting accounts receivable and the costs of absorbing price fluctuations relative to currency conversion rates. The shipper incurs similar administrative costs to receive the bill, match it with the BOL, manually check the contracts to determine if pricing is correct, generate and deliver payment to the carrier.

The complexity of modern transactions has also led to expensive administrative costs associated with the transactions. Administrative costs include personnel, software, hardware, and entire departments created for managing commercial transactions to ensure accurate and timely billing and payment. These costs are furthered when transactional aspects become more complex, such as those involving fluctuating currency conversion rates. Most industries are quite competitive and any cost savings are therefore important. Administrative costs are targeted for reduction as no revenue is directly generated from administrative functions. However, administrative costs associated with commercial transactions have been difficult to reduce in the current business environment with widely diffused data and, in particular, with fluctuating currency rates for those transactions involving different currencies.

The above and other difficulties in the management and coordination of transactions have presented administrative and cost challenges to business entities on buyer and seller ends of transactions, as well as those involved in other aspects of such transactions.

SUMMARY

The present invention is directed to overcoming the above-mentioned challenges and others related to the types of devices and applications discussed above and in other applications. The present invention is exemplified in a number of implementations and applications, some of which are summarized below.

According to an example embodiment of the present invention, a transaction processing approach involves automatically processing transactions between transaction parties as a function or transaction party rules and a currency conversion term.

According to another example embodiment of the present invention, a transaction processing approach involves a transaction processor implemented for automatically processing currency exchange for a transaction involving contracting parties. The transaction processor is adapted to access contract-related business rules for the contracting parties and to automatically convert currency for a transaction related price for one of the contracting parties.

In one implementation, the transaction processor uses the business rules to select a particular source for use in determining a currency exchange rate to use in converting the currency. In another implementation, the transaction processor uses business rules to select a particular date and time to use in setting a currency exchange rate to use in converting the currency (implemented, e.g., where transaction parties are in different time zones).

In another implementation, a data storage arrangement stores the business rules used by the transaction processor. Transaction parties store business rules that can be used in a plurality of transactions. When the transaction processor receives transaction information for processing, it identifies parties to the transaction from the transaction information and accesses the stored business rules for the identified parties. Using these accessed business rules, the transaction processor automatically selects (e.g., using an exchange rate reference authorized by the business rules) an exchange rate and converts currency for the transaction using the exchange rate.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which.

Figure 1:
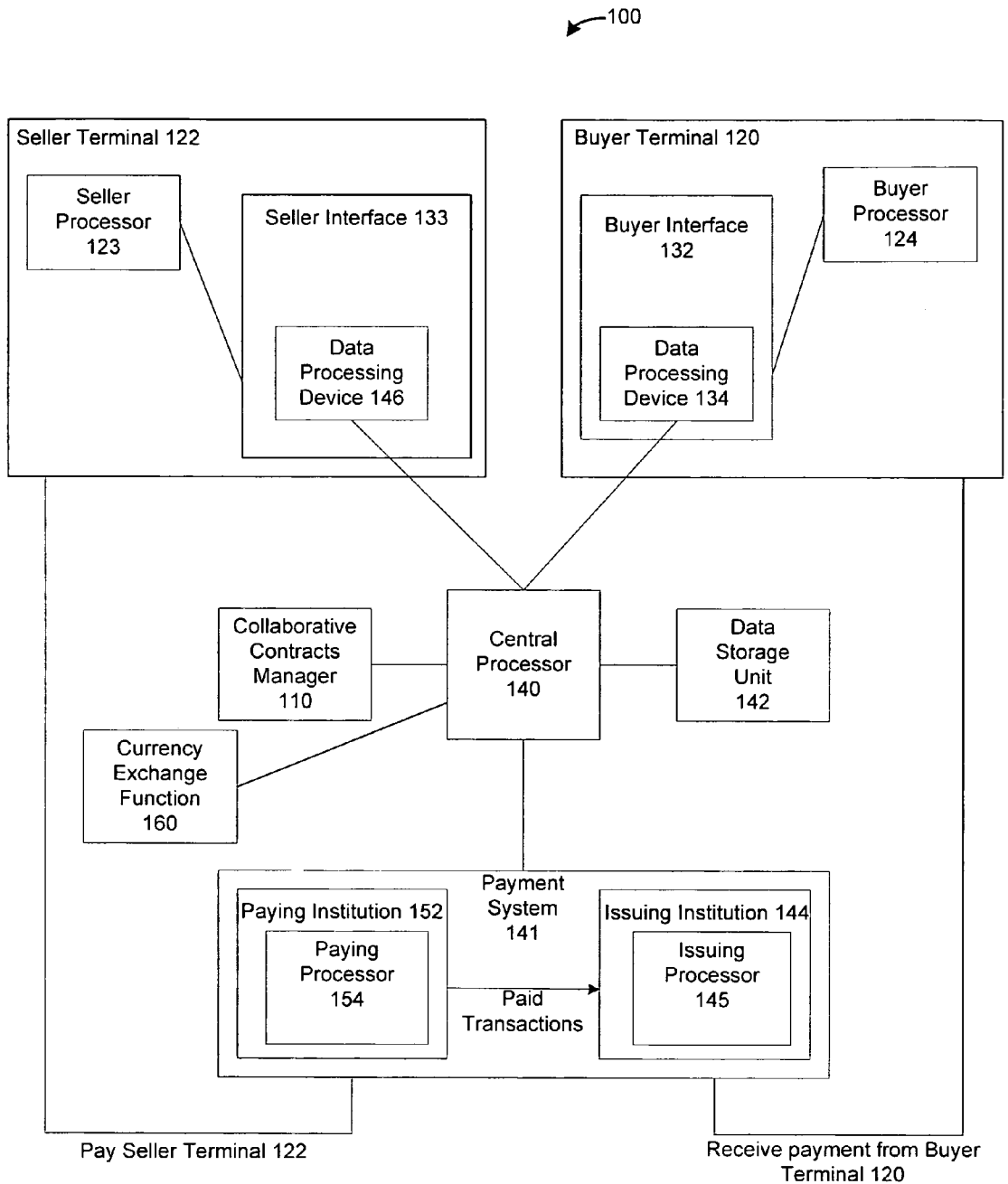
FIG. 1 shows an arrangement and approach for transaction management, according to an example embodiment of the present invention.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of communications and financial process management approaches, and has been found to be particularly useful for applications involving the operational implementation and application of pricing (and related currency conversions) to transactions, payments, tracking and related aspects thereof. While the present invention is not necessarily limited to such approaches, various aspects of the invention may be appreciated through a discussion of various examples using these and other contexts.

According to an example embodiment of the present invention, a transaction management arrangement uses transaction party (e.g., buyers and sellers) information to automatically derive pricing and/or payment options with currency conversion for individual transactions. The transaction information may include, for example, the identities of transaction parties, goods or services of the transaction, rules for processing currency conversions, user profile information specific to a particular party or parties to the transaction and others. When payment-related transaction functions are carried out, the currency conversion information is used to determine a payment amount for one or more of the transaction parties.

The transaction information may be set out in specific contracts between transaction parties or implemented using previously-agreed upon or otherwise standard transaction practices. For instance, specific contracts under the terms of which a transaction is being prosecuted may include prices agreed upon between a buyer and seller for a particular item and/or transaction rules agreed upon for setting certain prices between a buyer and seller and for performing currency conversions. Conditional contract terms may also be implemented to facilitate the selection between one or more different contract terms, or to facilitate the derivation of a new contract term.

Payment-related transaction functions as described above typically involve actual payment (i.e., transfer of money) to a seller on behalf of a buyer as well as settlement functions involving funding and accounting. In some applications, settlement functions involve the passage of information for accounting purposes including the posting of payment against accounts receivables. In addition, settlement functions involve, where appropriate, collecting money relating to the payment directly and/or via an indirect approach such as the drawdown of a credit line (and related accounting).

Another example embodiment of the present invention is directed to a processing system that automatically manages transactions using a database implementation that provides a source of product prices and contracts for a multitude of transactions and transaction parties. In advance of any transaction, prospective buyers and sellers negotiate and/or validate prices and contract terms, or simply validate the electronic representation of prices and contract terms negotiated through other means. For each contract, a buyer reviews, accepts and/or disputes contract term(s) or contract term updates. Once the buyer accepts a contract, a processing center stores the accepted contract and activates the contract for current and/or future transactions.

A collaborative contracts manager applies contract terms for actual performance of the contract, with parties involved in the transaction defining the applicable contract terms including pricing and related currency conversion terms. In some instances, parties to the transaction directly define contract terms by agreeing to specific terms. In other instances, parties to the transaction indirectly define contract terms by setting business rules by which the party is willing to participate in transactions. The collaborative contracts manager then uses these business rules to set contract terms. These business rules may, for example, be derived from and/or include buyer and/or seller profile information that includes contract-related data such as product, pricing, currency-conversion terms, shipping, payment terms, currency type, customs information and other typical contract data. The business rules may also include information that relates to a particular type of transaction or generally accepted contract type terms, and may not necessarily be specific to a particular transaction party or a particular transaction. Furthermore, the business rules may be implemented with tolerance information, such as tolerance payment ranges, currency conversion rate tolerance, delivery term ranges and other information for use in automatically negotiating or otherwise setting contract terms. These business rules can be stored in a database accessible to the collaborative contracts manager. All pricing information and business rules are retrievable by a transaction manager or by applications remote from the collaborative contracts manager such as those located at buyer or seller locations (with security controls for remote access).

In some instances, the collaborative contracts manager automatically resolves (or attempts to resolve) transaction disputes or incongruous contract terms. Predefined and accepted business rules are used to automatically arrive at contract terms prior to executing a transaction. In addition, where business rules for different parties to a transaction call for different contract terms, the collaborative contracts manager attempts to automatically resolve the different terms using tolerances or other information allowing variance from actual business rules. For example, when used for currency conversion type applications, the collaborative contracts manager sets conversion parameters such as conversion rate and conversion timing based on specific contract terms and/or business rules for each party to a transaction. When the collaborative contracts manager is unable to automatically resolve disputes or incongruous contract terms, the processing system alerts parties involved in the unresolved transaction, who can interact with the processing system to work towards resolution.

The user profiles discussed herein may include a variety of information for use in transaction management and otherwise. For instance, a typical such profile includes one or more of the following data: user identification information, business rules for the user, general ledger charts of accounts (e.g., and accounts receivable as posted against for payment processing as described above), identification of computer systems submitting contract or transaction data to the collaborative contracts manager, customer lists, vendor lists, contract and price approval policies, currency conversion policies, credit extension policies (e.g., for extending a credit liability to a transaction party), payment policies, transactional approval policies, operational roles (e.g., defining what functions a user associated with that role can perform), organizational hierarchy (e.g., defining how much of a company's data universe a user associated with a particular organizational node can access), and users. Seller customer list profiles may also include information further defining the business relationship with the customer from the Seller's perspective, for example, such as a retail buyer relationship and/or a wholesale buyer relationship. Buyer vendor (e.g., seller or distributor) list profiles may also include information further defining the business relationship with the vendor from the Buyer's perspective.

In another example embodiment of the present invention, an electronic interface facilitates user access to a transaction management system such as that involving a collaborative contracts manager as discussed above. The electronic interface is adapted to communicate with the transaction management system for implementing a variety of processes, such as those involving the setting of contract terms, selection of currency conversion information and purchases of goods. The electronic interface also facilitates user-executed search functions for accessing information such as product information, product prices, currency information, contracts and price notes. Access to information via the user interface is adaptively controllable, for instance, using authorization approaches including user identification, interface identification, password access and others.

The approaches to the use of business rules as well as contract information and user profiles (as part of business rules or otherwise) as discussed herein may be implemented in a variety of manners. One implementation involves a transaction management approach that is based on business rules previously established by buyer(s) and seller(s). The transaction management system includes a computer and communications node adapted for deriving prices for transactions as a function of pricing rules that are agreed upon by buying and selling entities related to the transaction. These pricing rules may be implemented via the business rules and/or may be tailored to a specific transaction. For general information regarding the use of business rules, and for specific information regarding transaction processing approaches that may be implemented in connection with one or more example embodiments discussed here, reference may be made to U.S. patent application Ser. No. 10/436,878 filed on May 12, 2003 (U.S. Pat. No. 7,496,519), which is fully incorporated herein by reference.

In another example embodiment of the present invention, an automated pricing and payment system conducts transaction processes for transaction parties who provide respective sets of business rules with information for selecting a currency conversion standard. Currency conversion standards that may be implemented include, for example, public standards based upon published rates or other relative values of different currency, with the standards being susceptible to fluctuation as a function of currency conversion rates. The system includes a transaction processor that can be implemented, for example, using one or more of a variety of processors or combinations of processors, such as a CPU or a distributed processing arrangement with multiple processors that communicate over a network.

The transaction processor is adapted to receive and use the business rules to derive a specific term for a transaction to be implemented by transaction parties, and sets a transaction price (in a first currency) as a function of the specific term. The specific term may be derived using, for example, information in a contract between the transaction parties directly identifying a fixed transaction price, or information that uses characteristics of the transaction together with stored information to provide a flexible transaction price. The transaction processor further selects a currency conversion standard using the business rules, and, using the selected standard, converts the set price from the first currency into a second different currency for at least one party to the transaction. Payment and settlement are then effected for the transaction as a function of the set price, the business rules and the converted set price. For instance, with a seller and buyer who contract for goods, payment and settlement can be effected by paying the seller in the first currency at the set price, and by extracting funds from the buyer in the converted set price. Further, fees associated with the currency conversion are selectively assessed with the effecting of payment and settlement, with a fee built into the selected currency conversion standard and/or being assessed separately to one or both of the transaction parties by the transaction processor.

FIG. 1 is a communication system 100 including a collaborative contracts manager 110 for handling business transactions between a seller and a buyer respectively at a seller terminal 122 and a buyer terminal 120, according to another example embodiment of the present invention. The seller terminal 122 includes a seller processor 123 adapted to provide a seller profile and contract data representing contracts between the seller and one or more buyers, and to communicate the profiles and contract data to a seller interface 133. In some applications, the seller terminal also provides profile information pertaining to certain authorized buyers (e.g., buyers authorized to engage in transactions with the seller with the system 100). The seller interface 133 includes a data processing device 146 adapted to establish rules for a business transaction by submitting a seller profile, one or more authorized buyer profiles (in some instances) and contract data (i.e., received from the seller processor 123) to a processor 140. The seller interface 133 is further adapted for displaying contract data received from the processor 140, and communicating to the seller from the processor 140 the acceptance or dispute of contract data by a buyer. The processor 140 electronically organizes a seller's contract data using a seller's profile, with the contract data and profile being stored in a data storage unit 142. The seller terminal 122 facilitates access to the seller's contract data stored in the data storage unit 142 using, for example, authorization or password protection criteria (e.g., provided to the central processor 140, which in turn selectively grants access to the data as a function of the information provided via the seller terminal 122).

The buyer terminal 120 includes a buyer processor 124 adapted for generating a buyer profile and communicating the generated profile to a data processing device 134 at a buyer interface 132. The buyer interface 132 is adapted for displaying contract data received from the processor 140. The data processing device 134 communicates a condition of acceptance of contract data as input at the buyer interface 132 to the processor. The processor 140 is coupled to a collaborative contracts manager 110 that provides an interface for buyer and seller transaction management including pricing management. The processor 140 processes and stores pertinent business transaction information in the data storage unit 142, with access thereto being restricted to authorized users (i.e., authorized buyers and sellers via buyer and seller terminals).

One or both of the buyer and seller terminals 120 and 122 is further adapted to provide currency conversion terms, which can be stored at the data storage unit 142 (or, in the instance where a contract is currently processed, used directly by the processor 140). Using the buyer and seller profiles, the collaborative contracts manager 110 automatically sets prices for transactions between the buyer and seller and, for at least one of the buyer and seller, sets currency conversion parameters.

In one implementation, the processor 140 interfaces with a payment system 141 including an issuing institution 144 and a paying institution 152. An issuing processor 145 of the issuing institution 144 maintains a credit account for the buyer terminal 120 and debits (extends liability to) a particular buyer terminal's account for transactions managed with the communications system 100, such as the shipment cost of a product, the product cost and others. In response to transactions managed at the processor 140, a paying processor 154 of the paying institution 152 tenders payment to the seller terminal 122, for example, when the receipt of goods is acknowledged by a buyer or at the time a buyer makes a purchase.

In another implementation, the system 100 includes or is adapted to interface with one or more currency exchange functions, represented by currency exchange function 160. The currency exchange function 160 may be implemented via the processor 140, which may perform a currency exchange (and assess associated fees, or build the fees into the exchange rate). Rules for effecting currency exchange, such as how to determine the currency exchange rate (e.g., using a standard index) and others can be supplied by buyer, seller or other transaction parties. The exchanged currency value is used, where applicable, for communicating payment information to the payment system 141.

In some applications, the currency exchange function is implemented separately from the processor 140, which selects the exchange function to execute the exchange, e.g., by selecting a particular exchange company, by selecting a particular published standard for the particular type of currencies being converted or by selecting a standard among those available for the particular conversion. This external exchange is implemented at a position in the payment chain that is selected as a function of the application. For instance, when the seller wishes to be paid in a particular currency that requires a conversion, the processor 140 can direct the payment system 141 to use a particular source to execute the currency exchange function 160. In other applications, the payment system 141 performs the exchange.

In other applications involving an external exchange function, the party or parties performing the exchange also interact with the processor 140 and, in some instances, with the collaborative contracts manager 110. Such an external party may further implement user profiles and other information in a manner similar to that discussed above and as can be implemented with sellers or buyers via terminals 122 or 120, respectively. For example, contract terms such as exchange rate terms can be set using business rules related to the exchange rate, with the collaborative contracts manager using business rules to arrive at an acceptable exchange rate. The business rules used for setting an exchange rate are chosen as a function of the parties carrying out the exchange. For example, where a seller at seller terminal 122 requests to be paid in a particular currency, business rules for that seller and the entity performing the exchange may be used to set the exchange rate.

In various implementations, an entity managing the processor 140 may interact as an intermediary between a buying or selling party and a currency exchange entity. Here, the buying or selling parties arrive at a currency exchange agreement with the entity managing the processor 140. In turn, the entity managing the processor 140 may have a different agreement with a currency exchange entity. In this regard, the buying or selling party receives an exchange rate agreed upon via the processor 140, and the managing entity running the processor executes the exchange at a rate agreed upon with the currency exchange entity. In this regard, the managing entity running the processor 140 may negotiate a preferential exchange rate using its high volume (as generated by a multitude of buying and selling parties), and charge the buying and selling entities a less preferential exchange rate.

Figure 2:
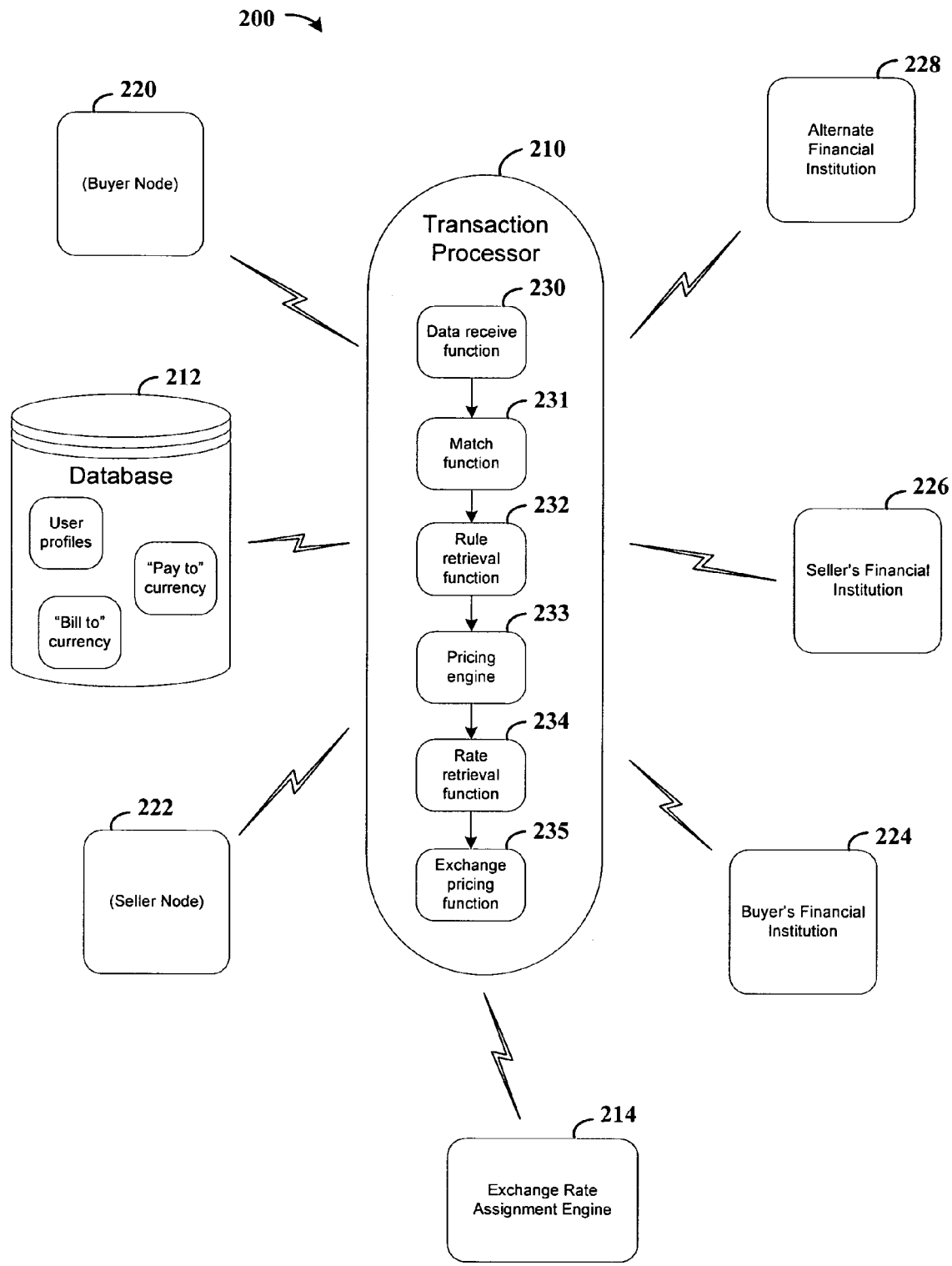
FIG. 2 shows a transaction processing arrangement, according to another example embodiment of the present invention.

FIG. 2 shows a transaction processing arrangement 200 including a transaction processor 210 programmed to automatically process currency conversion aspects of a transaction, according to another example embodiment of the present invention. The transaction processor 210 is in communication with a database 212 and an exchange rate assignment engine 214. The database 212 stores transaction-related information including rules for currency conversion, as well as auditing information for individual currency conversions as applicable to one or more transactions. The currency conversion engine 214 processes currency conversion related aspects of a transaction using rules from the database 212 and at the direction of the transaction processor 210. In various implementations, the database 212 and/or the exchange rate assignment engine 214 is implemented as part of the transaction processor 210. In other implementations, one or both of the database 212 and the exchange rate assignment engine 214 are located at a remote location and/or include a plurality of circuits at different locations.

A plurality of user nodes 220, 222, 224, 226 and 228 are communicatively coupled with the transaction processor 210. The user nodes 220-228 may, for example, include one or more of a buyer, seller, distributor, shipper, carrier, government agency, financial institution or other type of individual, group or agency that would be involved in a transaction. Referring to FIG. 1 as an example, one or more of the seller terminal 122, buyer terminal 120, processor 140, payment system 141 or currency exchange entity effecting the currency exchange function 160 may be implemented at one of the user nodes 220-228.

In another implementation, the transaction processor 210 is adapted to automatically apply currency rules for assigning currency exchange rates or other parameters to a transaction when new transaction information is received or executed. This new transaction information may, e.g., be detailed in a transaction document such as an order or invoice. The currency rules are used by the exchange rate assignment engine 214 to assign the exchange rate to the transaction or to a portion of the transaction to which the exchange rate applies.

When an update to the currency rules is received at the transaction processor 210 (e.g., via one of the user nodes 220-228), a new call to assign an exchange rate to a transaction is made by the processor and corresponding updates are made. For instance, when a transaction for a particular user has been assigned a particular exchange rate parameter and that user inputs an update to currency rules used to assign the exchange rate parameter, the transaction processor 210 automatically updates the parameter assigned to the transaction. Optionally, the user providing the assignment rule update selectively controls the application of the updated rules, for example where the user desires to selectively apply the updated rules to new transactions.

The user nodes 220-228 can interact with the transaction processor 210 for providing a variety of different types of transaction-related information. Such transaction information may include, for example, currency exchange parameters, accounting rules, orders, invoices, shipping documents, payment authorization, payment execution, customs documents, security documents and others.

The transaction processor 210 records, in the database 212, currency-conversion related information to facilitate the auditing of individual and/or group transactions involving currency conversion. This information may include one or more of a variety of types of information, with examples applicable to FIG. 2 including "pay to" currency type and amount, "bill to" currency type and amount, conversion date/time and conversion rate. When outside entities at nodes 220-228 (or others, such as a regulatory entity) are allowed to access the database 212, audit information is made readily available (e.g., for compliance with Sarbanes-Oxley related rules).

The conversion date and rate are selectively applied to one or both of the "pay to" and "bill to" portions of the transaction as a function of the types of currencies and/or business rules associated with parties to a particular transaction. Where a transaction involves only one currency conversion (i.e., between a billing and paying currency), the transaction processor 210 performs a currency conversion in connection with the transaction portion relevant to the currency conversion.

The transaction processing arrangement 200 can be implemented using a multitude of nodes and arrangements, and is applicable to a variety of transaction processing approaches. However, for purposes of discussion, each of the user nodes is implemented as follows in connection with a particular transaction. Node 220 is a buyer node representing a buyer in a transaction and node 222 is a seller node representing a seller. Nodes 224, 226 and 228 respectively represent financial institutions.

The buyer 220 and the seller 222 provide business rules that are stored in the database 212 for use by the transaction processor 210. When a transaction initiating event such as a request for goods and/or services by the buyer 220 occurs, the transaction processor 210 retrieves and uses the business rules to derive a term for use in setting a price for the transaction. For example, where the buyer 220 and seller 222 store business rules indicating a contractual relationship and information for setting a price, the transaction processor 210 derives a price term, such as the price per unit, for the transaction.

The transaction processor 210 receives transaction initiating event data with a transaction data receiving function 230 and matches the event data with a particular user (e.g., the buyer 220 and/or the seller 222) with a match function 231. Such event data may include, for example, an order or an invoice relating to a transaction between users. The matching may involve, for example, matching the event data to a particular user or to a particular transaction using a product identification term that is associated with goods and/or services for the transaction. A rule retrieval function 232 implements the matched user information to retrieve business rules applicable to the transaction event from the database 212 (e.g., by retrieving business rules tagged or otherwise associated with the matched user information).

A pricing engine 233 uses the retrieved business rules to set a price for the transaction in a first currency, for example, by using contract price information in the business rules or by calculating a price using terms in the business rules and other characteristics of the transaction such as quantity, transportation or regulatory issues. The pricing engine 233 uses information in documents (e.g., the transaction initiating event data) to identify those rules in the retrieved rules to use in setting the price. Such information may include, for example, a contract identifier that identifies a specific contract to which the information applies, an item identifier that identifies an item for which the price is being set, a currency code identifying the currency in which the transaction is denominated, a quantity and an order date. Using these approaches, the price set via the pricing engine is the "pay to" price for the seller 222 to be paid.

An exchange rate retrieval function 234 retrieves an exchange rate using the business rules and the exchange rate assignment engine 214. In some instances, the exchange rate assignment engine 214 is functionally implemented with the exchange rate retrieval function 234. The business rules may specify a particular approach to assigning an exchange rate, such as by identifying a particular conversion standard to use (e.g., a published standard), or by identifying a conversion standard using input received from one or more of the buyer and seller. After the exchange rate has been set, an exchange pricing function 235 sets the price for the transaction in a second currency. This price is the "bill to" price that the buyer 220 will be billed for the transaction.

The transfer of funds between the financial institutions 224, 226 and, in some instances, 228 is carried out in accordance with the above approach. For example, where the financial institutions 224 and 226 are respectively the buyer's and seller's financial institutions, funds in the "bill to" amount are transferred from the buyer's financial institution and funds in the "pay to" amount are transferred to the seller's financial institution. In some instances, the business rules in the database 212 indicate that one of the buyer's and seller's financial institutions will carry out a currency conversion. In other instances, the business rules specify that a third financial institution 228 will carry out the currency conversion.

In some applications, the transaction processor 210 further carries out settlement functions for transactions, including, e.g., functions relating to accounting and payment functions. In one accounting function example, when the seller 222 is paid on behalf of the buyer 220 (with appropriate currency conversion characteristics), the transaction processor 210 automatically posts the payment against an accounts receivable record for the seller 222 (e.g., stored in the database 212, at the seller 222 or elsewhere). In a payment function example, the transaction processor 210 selects a funding source for paying the seller 222 and, accordingly, carries out payment settlement functions for extracting funds from the buyer 220. These funds may be extracted directly (e.g., from the buyer's financial institution 224) or indirectly via a credit extension approach, such as by drawing down a credit line for the buyer. In some applications, funds are extracted directly and accordingly provided directly to the seller 222. In other applications, funds are provided to the seller 222 on behalf of the buyer 220, with the payment settlement function being subsequently carried out for retrieving funds from the buyer to cover the payment for the seller (and, e.g., to cover processing and/or conversion fees).

In some implementations, the transaction processor 210 carries out the currency conversion using, for example, the third financial institution 228. Funds associated with the "bill to" amount received from the buyer's financial institution 224 are transferred to the third financial institution 228, and funds in the "pay to" amount are transferred from the same (or another) financial institution and transferred to the seller's financial institution 226.

While a variety of currency conversion related payment functions can be implemented with the transaction processor 210, with a few examples of these functions discussed above, the transaction processor records auditing data regarding each conversion. This data may be stored, for example, in the database 212 or provided to one or more of the nodes 220-228. Example auditing data includes one or more of the "bill to" and "pay to" amounts (and currency types), as well as the transaction date, exchange rate information and more as discussed above and otherwise.

In a more particular implementation, the transaction processor 210 further provides reconciliation information for ameliorating invoice or other discrepancies relating to currency conversions. Discrepancies may arise, for example, where the transaction is susceptible to fluctuation in currency exchange rate. Other discrepancies (or the potential for discrepancies) arise when timing characteristics of a particular transaction affect exchange rate; in these instances, the transaction processor 210 records the time used in determining the exchange rate.

Associated fees with the conversion may be assessed to the buyer 220 and/or the seller 222 using one or more of a variety of approaches. These fees may be either built into the currency conversion to the "bill to" amount or separately assessed to the seller 222 and/or another party and may, e.g., be based on business rules stored in the database 212.

Various bases may be used in determining which financial portion of a particular transaction is to be used in assessing fees (or, accordingly performing the currency exchange with built-in fees). For example, in the instance where a transaction uses the "bill to" amount as the basis for performing a currency conversion, a particular transaction amount is agreed to in terms of the buyer's currency. Using nodes 220 and 222 respectively as buyer and seller nodes again, the transaction processor facilitates the billing of the buyer 220 in the transaction amount ("bill to" amount) in a first currency. A currency conversion is then made from the "bill to" currency to the "pay to" currency, with the "pay to" currency being provided to the seller 222. Fees associated with this currency conversion may, for example, be built into the conversion or separately assessed to the seller and/or other party (e.g., based on business rules).

A variety of other transaction-related aspects may be implemented with the system 200 as discussed above or otherwise. In some instances, one or more of the user nodes 220-228 include control input interfaces (e.g., graphic user interfaces) that communicate with the transaction processor 210, with users at the nodes being able to provide transaction-related information such as currency exchange rules. In other instances, the transaction processor 210 automatically accesses information from the user nodes for a variety of purposes, such as retrieving currency exchange rules (e.g., rates, rate sources or exchange sources) or updating related fields. This interaction between the nodes and the transaction processor 210 is controlled using, for example, authorization for access such as password-protected authorization and others.

Depending upon the application, the transaction processor 210 assesses fees to one or more of the user nodes 220-228. In some instances, these fees are built into currency exchange types of transactions. In other instances, the fees are based upon a percentage of the amount of payment for a transaction. In still other instances, the fees involve both a fee based on the amount of payment for a transaction as well as an amount relating to a currency conversion. These fees may be applied to one or more of the parties to the transaction, depending upon the nature of the transaction, contract agreements with transaction parties and other considerations. For instance, some transaction implementations involving buyers and sellers are processed such that the seller pays all fees associated with a particular transaction. Processing fees such as these are allocated for the operator of the transaction processor 210, which may be an entity separate from any transaction or integral to the transaction, such as a financial institution related to one of the transaction parties.

In another example embodiment, the transaction processor 210 is further adapted to grant and control information exchange with the database 212 as a function of inputs received from the nodes 220-228, such as authorization inputs and transaction-specific inputs. When users at one of the nodes 220-228 attempt to send information to or retrieve information from the transaction processor 210, authorization information from the users is used to control the information transfer. The authorization information may include, for example, access-type information (e.g., a password or user ID) or simply document information that the transaction processor 210 recognizes.

The transaction processor 210 is configured and arranged to outsource bulk currency conversions involving two or more transactions, according to another example embodiment of the present invention. For example, where multiple transactions involve conversion between a first currency and a second currency, the transaction processor 210 can selectively have a bulk sum of funds converted, commensurate with the combined sum from the multiple transactions, from an external financial institution. The transaction processor 210 can then effect payment and settlement for the transactions, using the converted funds for all of the multiple transactions. In some applications, the transaction processor 210 converts funds for each transaction using a conversion rate that is higher than the obtained conversion rate for the bulk conversion, keeping a net difference in funds as a transaction fee for performing the conversion, for each transaction. Furthermore, conversion rates for different transaction parties among the multiple transactions may be differently applied, for example, as relevant to contracts between the transaction parties and an operator of the transaction processor 210. The conversion rates may further be selected, for each transaction party, from a range of rates deemed acceptable in a contract with each transaction party. These rates and their applications are implemented using business rules for each transaction party, as appropriate, by the transaction processor 210.

Figure 3:
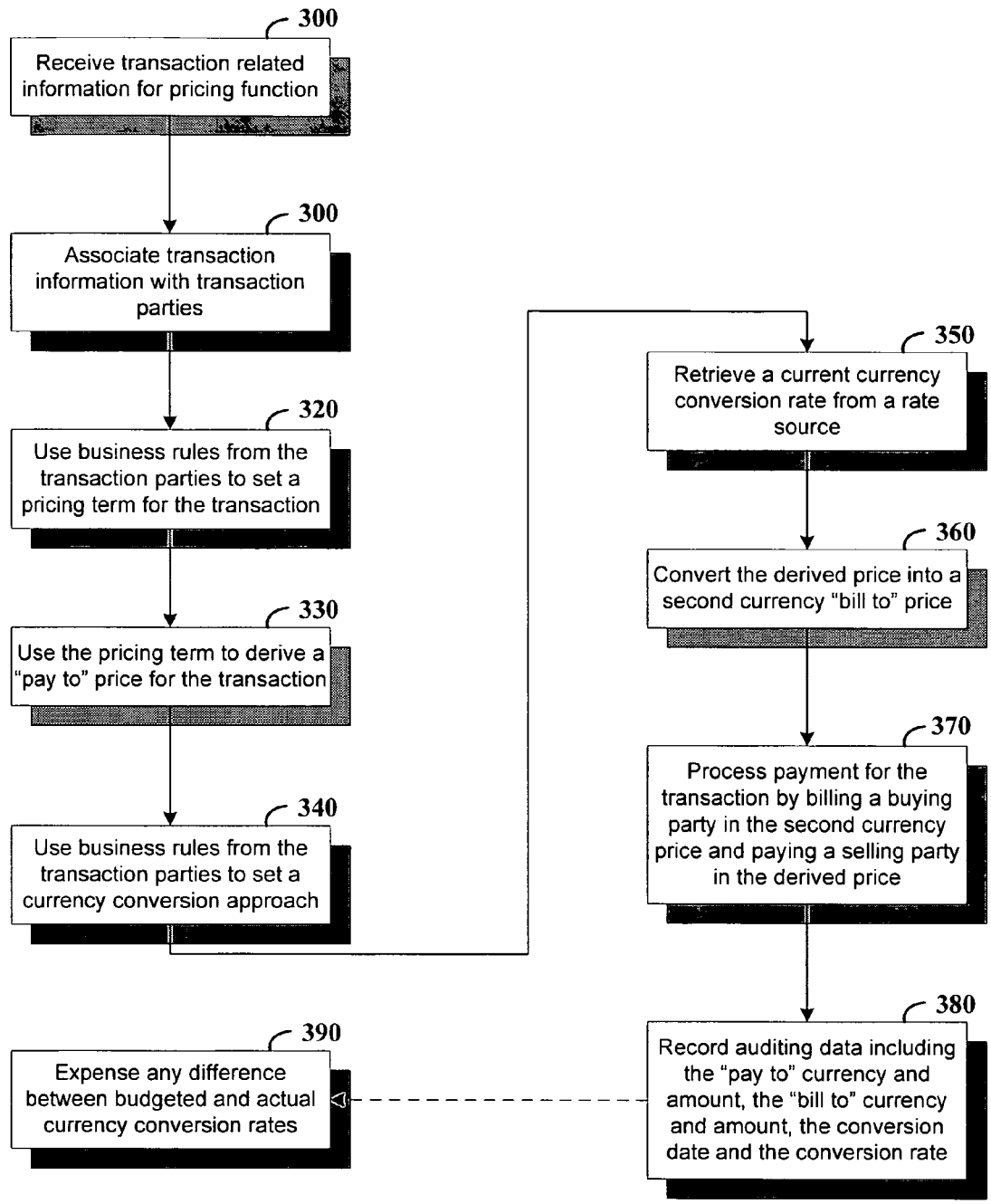
FIG. 3 is a flow diagram showing an approach for transaction management involving currency conversion, according to another example embodiment of the present invention.

FIG. 3 is a flowchart illustrating an example approach for automated transaction management involving currency conversion, according to another example embodiment of the present invention. Transaction-related information for a pricing function is received at block 300. This transaction-related information may include, for example, an electronic order or invoice, or other information describing pricing or currency characteristics for a particular transaction or portion of a transaction. The transaction-related information also includes identification data for at least one transaction party.

At block 310, the transaction-related information is associated with transaction parties using the identification data, which can include one or more of a variety of information that can be used to identify one or more transaction parties. For example, data in an electronic document can be used to identify the source of the document, which is then identified as one of the transaction parties. The data may also be used to directly identify a transaction to which the data applies using, e.g., a transaction ID number. Further, the data can be used indirectly to identify a transaction to which it applies, with one or more characteristics of the transaction being ascertained and associated with a particular transaction (e.g., where a certain amount of matching data is used to define a match between the data and a transaction).

A pricing term is set using business rules from one or more parties to the transaction at block 320, and a price for the transaction is set using the pricing term at block 330. After the price has been set, a "pay to" price is derived at block 340, representing the price (in a first currency) to be paid to a seller transaction party.

At block 340, business rules from the transaction parties are used to establish currency conversion rules. The currency conversion rules may include, for example, one or more of the above-discussed rules and characteristics associated with currency conversion such as conversion rate, currency type and exchange source. At block 350, a currency conversion rate is retrieved from a rate source, such as a publicly-available rate source, and used to set a currency conversion rate. At block 360, the derived "pay to" price is converted to a different currency at a "bill to" price using the set currency conversion rate, the "bill to" price being billed to a buyer transaction party.

After the "bill to" price has been set, payment is processed at block 370, with the buyer transaction party being billed in the "bill to" amount and the seller transaction party being paid in the "pay to" amount. Funds from each separate currency for the "bill to" and "pay to" amount are typically collected and paid from a common financial source, which extracts value from the conversion.

In some implementations, a payment processing entity facilitates the receipt and payment of "bill to" and "pay to" funds by exchanging a debt responsibility with different financial institutions. For example, where the payment processing entity is owed funds in the "pay to" currency from a first bank, funds in the amount of the "pay to" amount can be transferred from the first bank to the seller transaction party. The payment processing entity then takes as a receipt the funds from the buyer transaction party in the "bill to" amount and currency. Similarly, where the payment processing entity owes funds in the "bill to" currency to a creditor, payment in the "bill to" amount from the buyer transaction party (or the associated financial institution) can be directed to the creditor, with the payment processing entity paying the seller transaction party the "pay to" amount in the "pay to" currency.

At block 380, auditing data is recorded for tracking purposes relating to the currency conversion and the transaction in which it is implemented. For instance, the "pay to" and "bill to" currency and amount are stored, as well as information that can be used to substantiate a currency conversion rate, such as conversion date and rate. The conversion date information is further stored as relevant to a particular time zone, such that transactions with parties in different time zones can be facilitated. The particular time zone (as well as other currency conversion parameters) may, for example, be retrieved with the business rules at block 320.

Referring to FIG. 3 and as understood in connection therewith, an example rate-change expensing approach is shown in connection with block 390, selectively implemented with the approach discussed above in connection with blocks 300-380. A difference (if any) between a budgeted and actual currency conversion rate is expensed at block 390 as specified by business rules implemented at block 320. As consistent with the discussion hereinabove, business rules can be used to assign a particular expense code, direct the recording of expense data relating to the conversion and/or assess the expense against an appropriate party. In these applications, the expensing at block 390 is assessed against that particular party bearing the cost.

In some applications, expensing any difference at block 390 also includes posting a financial records management system for at least one party to the transaction (e.g., to which the conversion expense applies) in a manner consistent with other discussion herein. This posting may involve, for example, recording information in a databank available to appropriate transaction parties, or sending data representing the expense to an appropriate transaction party's accounting location, such as at one of nodes 220-228 in FIG. 2.

The transaction processing approaches discussed above may be implemented in connection with a variety of types of business transactions involving the transfer of funds, including those discussed above and others. In this regard, for general information regarding transaction processing and for specific information regarding shipping type transactions and approaches with which the currency conversion approaches of the present invention may be implemented, reference may be made to U.S. Pat. No. 5,910,896 to Hahn-Carlson, which is fully incorporated herein by reference.

While certain aspects of the present invention have been described with reference to several particular example embodiments, those skilled in the art will recognize that many changes may be made thereto without departing from the spirit and scope of the present invention, aspects of which are set forth in the following claims.

What is claimed is:

1. An automated pricing system for use with transaction parties who provide respective sets of business rules for transactions to be processed, the system comprising:
    a database storing the business rules including the information for selecting a currency conversion standard and also storing tolerance information useful for setting contract terms, the tolerance information including at least one of: a tolerance payment range, a currency conversion rate tolerance, and a delivery term range; and
    a transaction processor computer circuit configured to access the business rules and operative using executable modules, with
        one of the modules configured with the computer circuit to, for each transaction, retrieve respective sets of business rules for parties involved in the transaction, the business rules including currency conversion base conditions, currency conversion tolerances and price tolerances,
        another module configured with the computer circuit to derive a specific term for each transaction, the transaction having a price in the base currency that is set as a function of the specific term,
        another module configured with the computer circuit to select a currency conversion standard for each transaction as a function of the business rules, the currency conversion standard being susceptible to fluctuation as a function of currency conversion rates,
        another module configured with the computer circuit to convert the set price, for each transaction, from the base currency into a converted price in a different currency as a function of the currency conversion standard and the currency-conversion tolerance information specified by the business rules,
        another module to use the respective sets of business rules provided by each of the parties to the transaction to select the currency conversion standard, the respective sets of business rules provided by each of the parties to the transaction including terms identifying a particular currency conversion standard, and to convert the set price from the first currency into a second different currency for at least one party to the transaction as a function of the currency conversion standard by using the currency conversion standard in response to the time that settlement is effected; and
        another module configured with the computer circuit, responsive to differences in business rules for each party used to derive the specific term, transform at least one of the business rules to set the price within the retrieved price tolerances, and deriving the specific term using the transformed business rules and according to the retrieved price tolerances.

2. The system of claim 1, wherein the transaction processor computer circuit is configured, with an executable module, to derive the specific term as a term that includes a price term characterizing a price of the transaction.

3. The system of claim 1, further comprising a data storage arrangement for storing the business rules, wherein the transaction processor computer circuit is configured to store the business rules in the data storage arrangement.

4. The system of claim 1, wherein the transaction processor computer circuit is further configured, with an executable module, to match a product identification term from a buyer with a seller product for identifying a particular product for which the specific term is derived.

5. The system of claim 1, wherein the transaction processor computer circuit is further configured, with an executable module, to:
    use business rules including terms identifying two or more currency conversion standards for different types of currency conversions and also including conversion tolerance terms for a transaction characterizing a contract between two parties; and
    select one of the two or more currency conversion standards as a function of the first and second currencies.

6. The system of claim 1, wherein the transaction processor computer circuit is configured, with an executable module, to
    access the respective sets of business rules provided by each of the parties to the transaction, the respective sets of business rules provided by each of the parties to the transaction including terms for use in selecting the currency conversion standard among two or more available currency conversion standards for converting from the first currency to the second currency, and
    select the currency conversion standard as a function of the accessed business rules.

7. The system of claim 1, wherein the transaction processor computer circuit includes a pricing engine module programmed to use business rules and transaction information to derive a pricing term for a transaction, the transaction information including an identifying characteristic for associating the transaction with a particular set of business rules that include tolerance terms for the transaction characterizing a contract between two remote parties, the tolerance terms including at least one of: a tolerance payment range, a currency conversion rate tolerance, and a delivery term range.

8. The system of claim 7, wherein the pricing engine module is programmed to derive a pricing term using transaction information including at least one of: a contract identifier for the transaction, an item identifier for an item being sold, a currency code identifying the currency in which the contract is denominated, quantity and order date.

9. The system of claim 1, wherein the transaction processor computer circuit is configured, with an executable module, to receive a currency selection term associated with one of the transaction parties for use in processing transactions for the one of the transaction parties.

10. The system of claim 1, wherein the transaction processor computer circuit is configured, with an executable module, to select a currency conversion standard as a function of business rules that include conversion tolerance terms for the transaction characterizing a contract between two remote parties.

11. The system of claim 1, wherein the transaction processor computer circuit is configured, with an executable module, to use business rules characterizing a contract between an operator of the transaction processor computer circuit and a remote party to select a currency conversion standard.

12. The system of claim 1, wherein the transaction processor computer circuit is further configured, with an executable module, to select the currency conversion standard as a function of the respective sets of business rules provided by each of the parties to the transaction and as a function of a current date and time at which the set price is converted.

13. The system of claim 12, wherein the transaction processor computer circuit is configured, with an executable module, to use the business rules to select the time at which the set price is converted.

14. The system of claim 1, wherein the transaction processor computer circuit is further configured, with an executable module, to select the currency conversion standard as a function of the respective sets of business rules provided by each of the parties to the transaction and of a particular reference date and time zone to use in selecting the currency conversion standard.

15. The system of claim 1, wherein the system is configured for use with a transaction involving a buyer and a seller and wherein the transaction processor computer circuit is adapted to convert the set price for the buyer or the seller into a currency selected by the buyer or seller for which the currency conversion is being made.

16. The system of claim 1, wherein the transaction processor computer circuit is configured, with an executable module for two or more transactions involving a currency conversion between a first and second currency during a particular business period, to convert a bulk sum of currency for all of the transactions from the first currency to the second currency and to effect payment individually for each party to each of the two or more transactions.

17. The system of claim 1, wherein the transaction processor computer circuit is further configured, with an executable module, to assess a currency conversion fee to the at least one party to the transaction.

18. The system of claim 1, wherein the transaction processor computer circuit is configured, with an executable module, to convert funds relating to the transaction from the first currency to the second currency at a first currency conversion rate and to convert funds for the at least one party to the transaction at a different currency conversion rate.

19. The system of claim 1, wherein the transaction processor computer circuit is configured, with an executable module, to
receive and use the respective sets of business rules provided by each of the parties to the transaction, the respective sets of business rules provided by each of the parties to the transaction indicating an acceptable range of currency exchange rates, and
select the currency conversion standard as a function of the acceptable range of currency exchange rates.

20. The system of claim 1, wherein the transaction processor computer circuit is configured, with an executable module, to use different currency exchange rate sources for different parties to the transaction.

21. The system of claim 1, wherein the transaction processor computer circuit is configured, with an executable module, to assess a user fee to the at least one party to the transaction for converting the set price.

22. The system of claim 1, wherein the transaction processor computer circuit is configured, with an executable module, to effect payment for the transaction as a function of the business rules and the converted set price by transferring funds in the amount of the converted set price to an owed transaction party identified by the business rules.

23. The system of claim 1, wherein transaction parties include a financial institution that facilitates the transaction payment, wherein the transaction processor computer circuit is configured, with an executable module, to effect payment by transferring an amount in a set price of the first currency to an owed transaction party from the financial institution while establishing a liability to the financial institution in the first currency amount.

24. The system of claim 1, wherein transaction parties include a financial institution that facilitates the transaction payment, wherein the transaction processor computer circuit is configured, with an executable module, to effect payment by transferring an amount in the converted set price of the second currency from an owing transaction party to the financial institution.

25. The system of claim 24, wherein the transaction processor computer circuit is further configured, with an executable module, to effect payment by transferring an amount in a set price of the first currency to an owed transaction party from a debiting financial institution that is indebted to the sponsoring financial institution.

26. The system of claim 1, wherein the transaction processor computer circuit is configured, with an executable module, to effect payment and settlement for the transaction by:
setting a pay to amount and currency for effecting payment to a seller party on behalf of a buyer party;
setting a bill to amount and currency for billing the buyer party for the effected payment and for transaction functions including the currency conversion.

27. The system of claim 1, wherein the transaction processor computer circuit is configured, with an executable module, to:
compare an actual currency conversion rate specified by the selected currency conversion standard to a budgeted currency conversion rate as specified by the business rules;
in response to the actual currency conversion rate being different than the budgeted currency conversion rate, assess a difference between the converted set price using the actual currency conversion rate and the converted set price using the budgeted currency conversion rate.

28. A transaction processing and currency conversion system, comprising:

a database storing business rules including information for selecting a currency conversion standard and also storing tolerance information useful for setting contract terms, the tolerance information including at least one of: a tolerance payment range, a currency conversion rate tolerance, and a delivery term range; and a computer circuit having respective software modules configured and arranged, with the computer circuit to access the business rules, and to:

receive respective sets of the business rules for transactions between transacting parties;

communicate with a plurality of buyer terminals and seller terminals and to provide a common source of data for users of the terminals, the data including seller offerings;

control access to the data and for configuring the type and arrangement of the data to be communicated with the at least one buyer terminal in response to the identification of a buyer receiving the communications;

use the respective sets of business rules provided by each of the parties to the transaction to select the currency conversion standard, the respective sets of business rules provided by each of the parties to the transaction including terms identifying a particular currency conversion standard, and convert the set price from the first currency into a second different currency for at least one party to the transaction as a function of the currency conversion standard by using the currency conversion standard in response to the time that settlement is effected;

for each transaction to be implemented by a buyer for the seller offerings, determine a currency conversion criterion by, using the business rules for the buyer and sellers to automatically derive a currency conversion criterion for the transaction based on currency-conversion tolerance information specified by the business rules and also by a currency conversion standard, responsive to the currency conversion criterion falling outside of a specific currency-conversion tolerance range for at least one of the parties, transforming the business rules for at least one party and using the transformed business rules to automatically derive a currency conversion criterion for the transaction that falls within the specific currency-conversion tolerance range; and use the currency conversion criterion to convert transaction price data from a first currency implemented by the seller in the seller offerings to transaction price data in a different currency.

29. The system of claim 28, wherein the computer circuit is further configured and arranged, with an executable module, to record an expense characterizing an assessed difference.

30. The system of claim 28, wherein the computer circuit is further configured and arranged, with an executable module, to post an assessed difference between the converted set price as an expense to a transaction party's accounting management system as a function of business rules for said transaction party.

31. An automated pricing system for use with transaction parties who provide respective sets of business rules for transactions to be processed using the automated pricing system, the system comprising:

a database storing business rules including the information for selecting a currency conversion standard and also storing tolerance information useful for setting contract terms, the tolerance information including at least one of: a tolerance payment range, a currency conversion rate tolerance, and a delivery term range;

means for accessing the business rules, and for receiving and using the business rules to derive a specific term for a transaction to be implemented by the buyer and seller, the transaction having a price that is set as a function of the specific term, the price being in a first currency;

selection means for selecting a currency conversion standard as a function of the business rules;

conversion means for converting the set price from the first currency into a second different currency for at least one party to the transaction as a function of the currency conversion standard, the set price being derived automatically and also being based on currency-conversion tolerance information specified by the business rules; wherein at least one of said conversion means and said selection means are configured to use the respective sets of business rules provided by each of the parties to the transaction to select the currency conversion standard, the respective sets of business rules provided by each of the parties to the transaction including terms identifying a particular currency conversion standard, and to convert the set price from the first currency into a second different currency for at least one party to the transaction as a function of the currency conversion standard by using the currency conversion standard in response to the time that settlement is effected; and means for providing a transaction price by,
responsive to the converted set price falling within a price tolerance in business rules for the at least one party to the transaction, providing the converted set price, and responsive to the converted set price falling outside of a price tolerance in business rules for the at least one party to the transaction, transforming a business rules term involving at least one of currency conversion and pricing parameters, and using the transformed business rules term to provide a resolved converted set price.

* * * * *